Sept. 18, 1928.
H. H. MANNING
BORING BAR
Filed Nov. 22, 1924
1,684,772
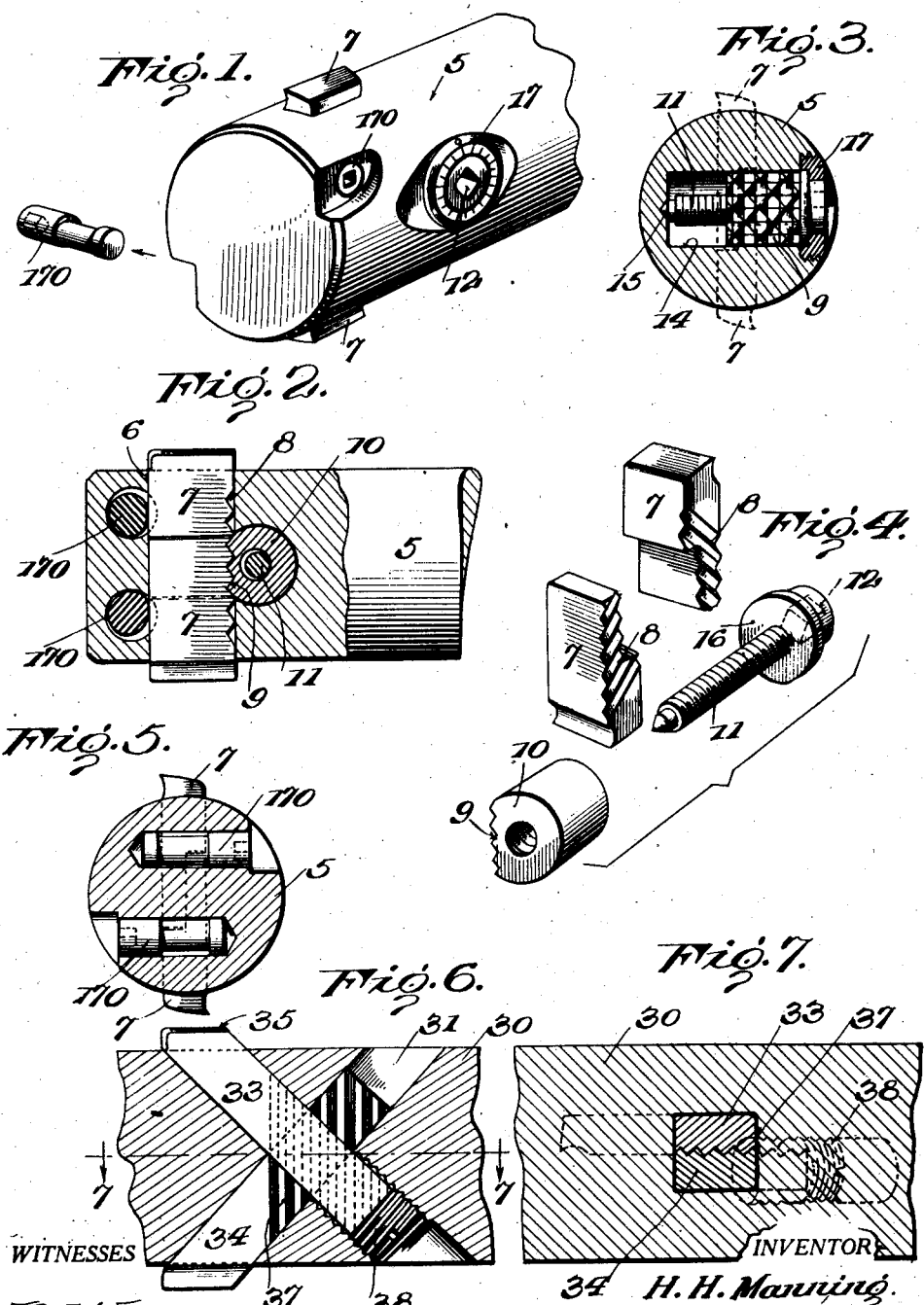
WITNESSES
W. A. Williams
Emmett F. Salter
INVENTOR
H. H. Manning.
BY
L. G. Quesada
ATTORNEY Patented Sept. 18, 1928.

1,684,772

UNITED STATES PATENT OFFICE.

HOWARD H. MANNING, OF MEADVILLE, PENNSYLVANIA, ASSIGNOR TO McCROSKY TOOL CORPORATION, OF MEADVILLE, PENNSYLVANIA.

BORING BAR.

Application filed November 22, 1924. Serial No. 751,628.

This invention relates to boring bars and more particularly to the means for adjusting the cutters thereof.

Briefly stated, an important object of this invention is to provide a boring bar wherein simple and reliable means are provided for simultaneously adjusting a plurality of cutters by the turning of a single adjusting member.

A further object is to provide a boring bar having novel means to hold the cutters securely in an adjusted position so that the cutting diameter of the tool is not decreased during operation.

Other objects and advantages will be apparent during the course of the following description.

In the accompanying drawing forming a part of this application and in which like numerals are employed to designate like parts throughout the same, Figure 1 is a perspective of the improved boring bar.

Figure 2 is a detail longitudinal sectional view through the same.

Figure 3 is a vertical transverse sectional view through the boring bar.

Figure 4 is a group perspective illustrating the cutters and the adjusting means therefor.

Figure 5 is a vertical transverse sectional view illustrating the means to hold the blades in a set position.

Figure 6 is a detail sectional view illustrating a modified form of invention.

Figure 7 is a detail sectional view taken on line 7—7 of Figure 6.

In the drawing the numeral 5 designates a boring bar having a transverse opening 6 receiving radially arranged cutters 7, the inner portions of which are reduced in thickness and are overlapped as illustrated in Figures 2 and 4.

Figure 4 also illustrates that one edge of each cutter is formed with diagonal grooves 8 arranged at right angles to the similarly formed grooves on the same edge of the outer cutter. The ribs formed by the grooves 8 are engaged by the intersecting ribs 9 on the flat face of an adjusting block 10. Figure 2 plainly illustrates that the intersecting ribs 9 are received in the grooves 8 and move the cutters 7 either in or out. Of course the longitudinal movement of the block 10 results in the radial movement of the cutters 7 and to bring about a longitudinal movement of the block 10 an adjusting screw 11 threaded through the block is turned by engaging a suitable tool with the head 12 of the same. The block 10 and the feed screw 11 are received in a socket 14 extending at right angles to the transverse opening 6 and the inner end of the screw 11 is received in a cone shaped recess 15 in the inner end of the socket 14 so that the feed screw may be conveniently turned.

The longitudinal movement of the feed screw 11 is limited in one direction by the engagement of the forward end of the same with the inner wall of the socket 14, while the movement of the screw in the other direction is limited by the engagement of an annular shoulder 16 on the rear portion of the same with the retaining nut 17 threaded into one side of the bar 5. The outer surface of the retaining nut 17 may be calibrated to co-operate with the head 12 in indicating the the position of the cutters.

From the foregoing it will be seen that the intersecting ribs 9 on the flat face of the sleeve or adjusting block 10 are received in the grooves 8 in the overlapped portions of the cutters 7 and thereby establish a constant operative connection between the block 10 and the cutters 7. As the inner portions of the cutters overlap each cutter has a contact with the adjusting block equal to the entire face of the block when the cutters are adjusted to the minimum diameter. In other words a substantial bearing surface is provided between the adjusting block and the cutters 7 so that the tool may be quickly adjusted to the desired diameter.

The cutters 7 may be engaged at their smooth edges by locking cams 170 by means of which the cutters are securely held in position.

In the operation of this form of invention the turning of the feed screw 11 moves the block 10 longitudinally so that the cutters 7 are moved radially to the desired position. It might be said that the cutters mutually brace each other due to their over-lapping and slidable connection as illustrated in Figures 2 and 4.

In the form of the invention illustrated in Figures 6 and 7 the boring bar is designated by the numeral 30 and is provided with diagonal slots or openings 31 for the reception of cutters 33 and 34, the outer portions of which are provided with cutting edges 35.

Figure 6 plainly illustrates that the cutters 33 and 34 are arranged at right angles to each other and have their opposed sides formed with interfitting ribs 37. The ribs extend diagonally of the cutters and at right angles to the longitudinal axis of the bar so that when one cutter is moved longitudinally of itself the other cutter is simultaneously moved.

Specifically, the diagonally extending cutter 33 is backed up by a screw 38 having means whereby the same may be engaged by a screw driver, a squared tool or the like. To adjust both of the blades simultaneously it is merely necessary to turn the screw 38 to advance the cutter 33 and the interfitting connection between the several cutters causes the cutter 34 to move also. The construction illustrated provides for exactly the same movement of the two cutters and a very fine adjustment may be made. Of course in carrying out the invention the diagonal opening for the reception of the cutter 33 has its wall threaded from the periphery of the bar to the opening extending at right angles thereto to provide for a wide range of adjustment.

The foregoing illustrates that the invention is capable of a variety of mechanical expressions and therefore it is to be understood that the form of the invention herewith shown and described is to be taken as a preferred example of the same and that such minor changes in arrangement and construction of parts may be made as will remain within the spirit of the invention and the scope of what is claimed.

Having thus described the invention, what is claimed is:—

1. A boring bar comprising a body, cutters movable through said body and formed with diagonal grooves, the grooves in one cutter being arranged approximately at right angles to the other grooves, an adjusting block having a flat side provided with rows of intersecting ribs received in said grooves of the cutters and movable at right angles to the line of movement of said cutters.

2. A boring bar comprising a body having a transverse opening, adjustable cutters received in said opening and formed with inclined grooves, and an adjusting block having a flat surface provided with rows of intersecting ribs received in said grooves of the cutters and movable at right angles to the line of movement of said cutters, and a feed screw threaded through said block.

3. A cutting device of the character specified comprising a body having an opening, cutters movable in said opening and filling the major portion of the same and having opposed contacting faces, said cutters having edges provided with grooves, and an adjusting block having straight intersecting ribs interfitting in said grooves and movable at right angles to the line of movement of said cutters to adjust the cutting diameter of the device 4. A rotary cutter comprising a body, cutters carried by the body, a longitudinally movable adjusting device positioned entirely at one side of the cutters and movable at an angle to the plane of the cutters, one side of the adjusting device being flat and having intersecting serrations, the edges of said cutters adjacent the flat serrated side of said adjusting device having serrations interfitting with the intersecting serrations of the adjusting device, the serrations in one cutter being at an angle to the serrations in the other cutter, and means whereby said adjusting device may be moved lengthwise.

5. A rotary cutter comprising a body having an opening, radially adjustable cutters in said opening and having overlapping inner terminal portions provided with serrations, an adjusting device at one side of said overlapping inner terminal portions and having straight intersecting serrations interfitting with the serrations on each of the cutters, and means to move the adjusting device transversely of said body.

6. A rotary cutter comprising a body, adjustable cutters associated with the body and having serrations, and an adjusting device having one face thereof provided with intersecting serrations defining facets engaging the serrations of said cutters 7. A rotary cutter comprising a body, adjustable cutters associated with the body and having serrations, and an adjusting device having intersecting serrations defining facets engaging the serrations of said cutters, said adjusting device being movable transversely of the body.

8. A rotary cutter comprising a body, adjustable cutters associated with the body and having serrations, an adjusting member movable transversely of the body and having intersecting serrations defining facets engaging the serrations of the cutters, and a feed screw engaged with said adjusting device and being extended transversely of the body.

HOWARD H. MANNING.